United States Patent
Reminnyi et al.

(10) Patent No.: US 11,853,270 B2
(45) Date of Patent: Dec. 26, 2023

(54) METHOD AND APPARATUS FOR VISUALIZING A PROCESS MAP

(71) Applicant: UiPath, Inc., New York, NY (US)

(72) Inventors: Oleksandr Reminnyi, Vinnytsia (UA);
Nataliia Zasoba, Lviv (UA);
Volodymyr Skalskyi, Vyshivka (UA);
Christian Berg, Seattle, WA (US);
Charles Park, Bellevue, WA (US);
Dmitrii Leonidovich Kondratiuk, Kharkov (UA)

(73) Assignee: UiPath, Inc., New York, NY (US)

( * ) Notice: Subject to any disclaimer, the term of this patent is extended or adjusted under 35 U.S.C. 154(b) by 179 days.

(21) Appl. No.: 16/917,861

(22) Filed: Jun. 30, 2020

(65) Prior Publication Data
US 2021/0406228 A1    Dec. 30, 2021

(51) Int. Cl.
*G06F 16/00* (2019.01)
*G06F 16/21* (2019.01)
*G06F 16/26* (2019.01)

(52) U.S. Cl.
CPC ............ *G06F 16/212* (2019.01); *G06F 16/26* (2019.01)

(58) Field of Classification Search
CPC ... G06F 16/212; G06F 16/26; G06Q 10/0631; G06Q 10/0639; G06Q 10/10; G06Q 10/105; G06Q 10/0633
USPC ........................................................ 707/793
See application file for complete search history.

(56) References Cited

U.S. PATENT DOCUMENTS

| | | | | |
|---|---|---|---|---|
| 6,671,874 | B1* | 12/2003 | Passova | G06F 8/73 |
| | | | | 717/126 |
| 8,321,251 | B2 | 11/2012 | Opalach et al. | |
| 8,619,084 | B2 | 12/2013 | Curbera et al. | |
| 8,719,775 | B1* | 5/2014 | Cole | G06F 11/3664 |
| | | | | 717/124 |
| 8,782,103 | B2* | 7/2014 | Ahlborn | G06Q 10/0633 |
| | | | | 707/812 |
| 9,342,272 | B2* | 5/2016 | Tattrie | G06F 8/30 |
| 10,339,027 | B2 | 7/2019 | Garcia et al. | |
| 2006/0253490 | A1* | 11/2006 | Krishna | G06F 16/93 |
| 2009/0018877 | A1* | 1/2009 | Houck | G06Q 10/00 |
| | | | | 705/7.11 |

(Continued)

FOREIGN PATENT DOCUMENTS

KR    10-2012-0067726 A    6/2012

OTHER PUBLICATIONS

Blickle et al., "Automatic Process Discovery with ARIS Process Performance Manager (ARIS PPM)," Expert Paper, IDS Scheer, 2009, pp. 1-12.

(Continued)

*Primary Examiner* — Vincent F Boccio
(74) *Attorney, Agent, or Firm* — CHIESA SHAHINIAN & GIANTOMASI PC

(57) ABSTRACT

A method for visualizing a process map is executed by a process map server. The method includes receiving a flowchart and a step-by-step recording related to a process. Generating a process map by combining the flowchart and the step-by-step recording and displaying the process map. The process map displays a task, step, and action related to the process. A detail window shows information associated with the process, and portions of the process, in response to user input. The action is based on information from the step-by-step recording.

20 Claims, 7 Drawing Sheets

(56) References Cited

U.S. PATENT DOCUMENTS

| | | | |
|---|---|---|---|
| 2009/0287958 A1* | 11/2009 | Bhatt | G06F 11/3684 |
| | | | 714/26 |
| 2012/0253880 A1 | 10/2012 | Kumar et al. | |
| 2013/0159047 A1 | 6/2013 | Mayerle et al. | |
| 2013/0297528 A1 | 11/2013 | Stiehl | |
| 2014/0019190 A1* | 1/2014 | Arend | G06Q 10/0633 |
| | | | 705/7.26 |
| 2014/0282199 A1* | 9/2014 | Basu | G06F 3/0484 |
| | | | 715/772 |
| 2014/0324518 A1* | 10/2014 | Roitman | G06F 30/18 |
| | | | 705/7.27 |
| 2015/0142587 A1* | 5/2015 | Salgar | H04N 7/181 |
| | | | 705/18 |
| 2017/0213167 A1 | 7/2017 | Rinke et al. | |
| 2020/0349486 A1* | 11/2020 | Moolman | G06F 30/00 |

OTHER PUBLICATIONS

International Search Report and Written Opinion dated Mar. 29, 2021, in connection with International Patent Application No. PCT/US2020/052219, 9 pgs.

* cited by examiner

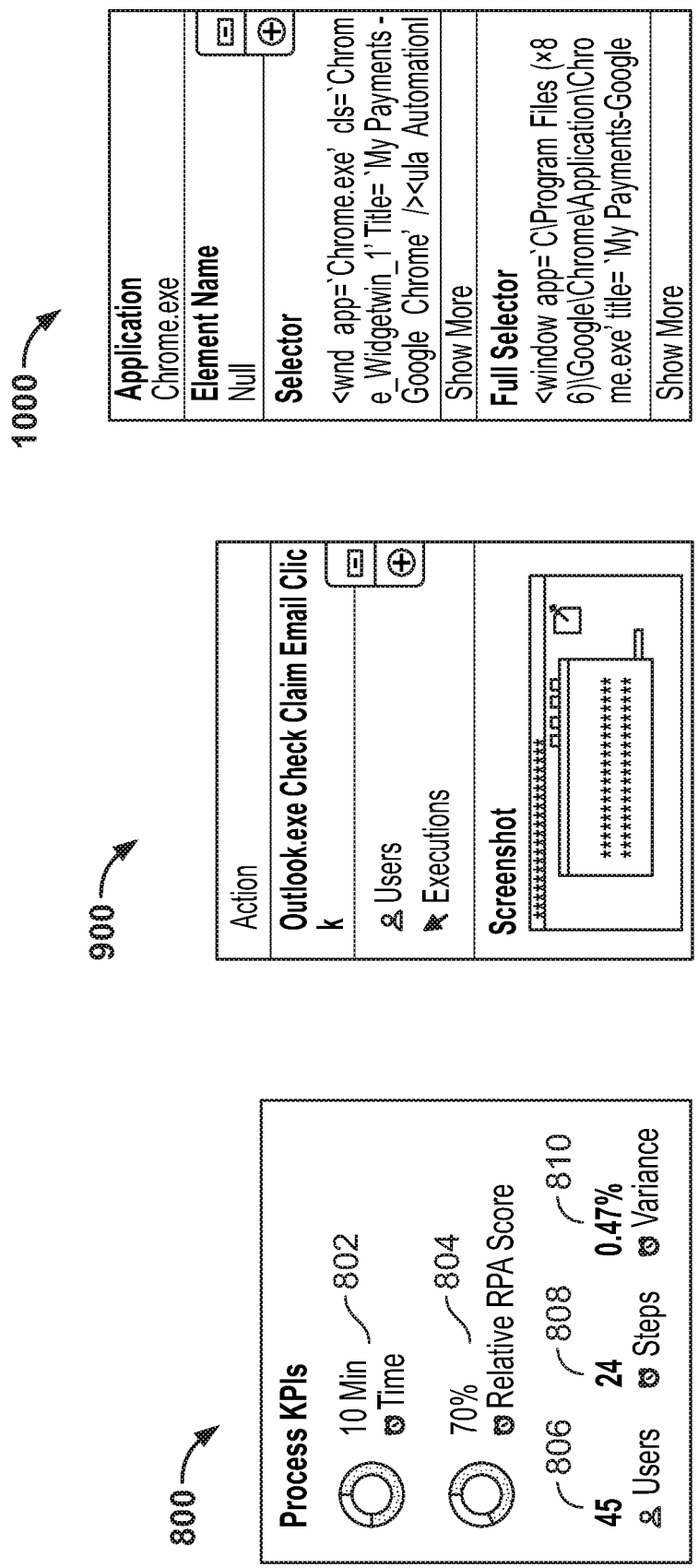

METHOD AND APPARATUS FOR VISUALIZING A PROCESS MAP

FIELD

The present disclosure relates generally to task mining and more particularly to visualizing a process map of a process using a step-by-step recording and flowcharts associated with the process.

BACKGROUND

A process is a series of actions that may be performed by a person or machine. A process may consist of any number of actions and could be simple or complex. For example, a persons associated with a payroll function in a company may perform the process of generating paychecks for employees of that company on a weekly basis. This process requires a significant amount of the person's time throughout the year, particularly if there are a large number of employees and a large number of paychecks to process. Further, if there is only one person performing a particular process, then it may be difficult or impossible for others to perform the process when that person is unavailable.

Automation can improve the efficiency of processes thereby allowing the person normally assigned to the process to spend time on other tasks, such as those that cannot be automated. Process automation requires detailed information about the process and analysis of that information.

SUMMARY

A method for visualizing a process map of a process is executed by a process map server. The method includes receiving a flowchart and a step-by-step recording related to a process. A process map is generated by combining the flowchart and the step-by-step recording and the process map is then displayed. In one embodiment, the process map displays one or more tasks, steps, and actions related to the process. A detail window shows information associated with the process, and portions of the process, in response to user input. In one embodiment, the action is based on information from the step-by-step recording.

BRIEF DESCRIPTION OF THE DRAWINGS

FIG. 7 shows a process detail popup window according to an embodiment;

FIG. 8 shows a step popup window according to an embodiment;

FIG. 9 shows an action popup window according to an embodiment; and

DETAILED DESCRIPTION

Figure 1:
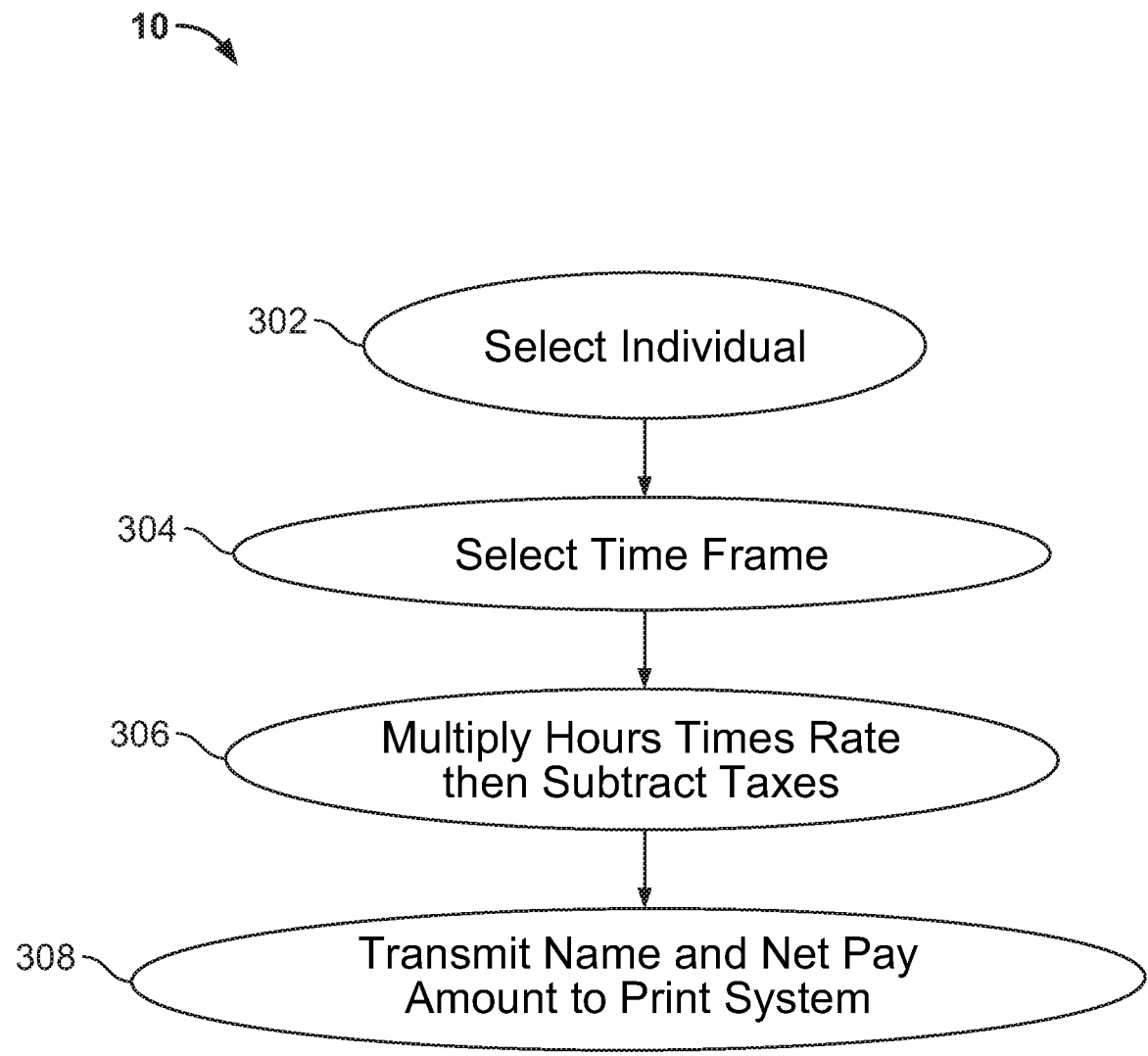
FIG. 1 shows a process according to one embodiment.

FIG. 1 shows an exemplary process 10 for generating employee paychecks.

Process 10 comprises several actions that, in this example, are performed by a person using a computer. SELECT INDIVIDUAL action 302 is the first action performed by the person on the computer. The person completing action 302 selects an individual for which the person will generate a paycheck. The individual, in one embodiment, can be selected from a list of employees. At SELECT TIME FRAME action 304, the person identifies the time frame for which the individual selected in action 302 should be paid. For example, the person can select the previous week as the time frame for which the employee will be paid. At MULTIPLY HOURS TIMES RATE THEN SUBTRACT TAXES action 306, the person uses the computer to determine the selected individual's net pay by determining the selected individual's gross pay and then subtracting taxes from the determined gross pay. For example, the person first determines the selected individual's gross pay by multiplying the number of hours the selected individual worked over the selected time frame by the selected individual's rate. The taxes that the selected individual must pay for the selected time frame are then subtracted from the gross pay in order to determine the selected individual's net pay. At TRANSMIT NAME AND NET PAY AMOUNT TO PRINT SYSTEM action 308, the person uses the computer to transmit the selected individual's name and net pay amount to a print system that will print a check for the selected individual based on the net pay amount transmitted.

Process 10 may be repeated multiple times with a different individual selected each time. For example, a person may generate multiple check requests in order to request paychecks for each employee of a company. Process 10 may be repeated for each pay period. For example, the person may perform process 10 weekly.

Figure 2:
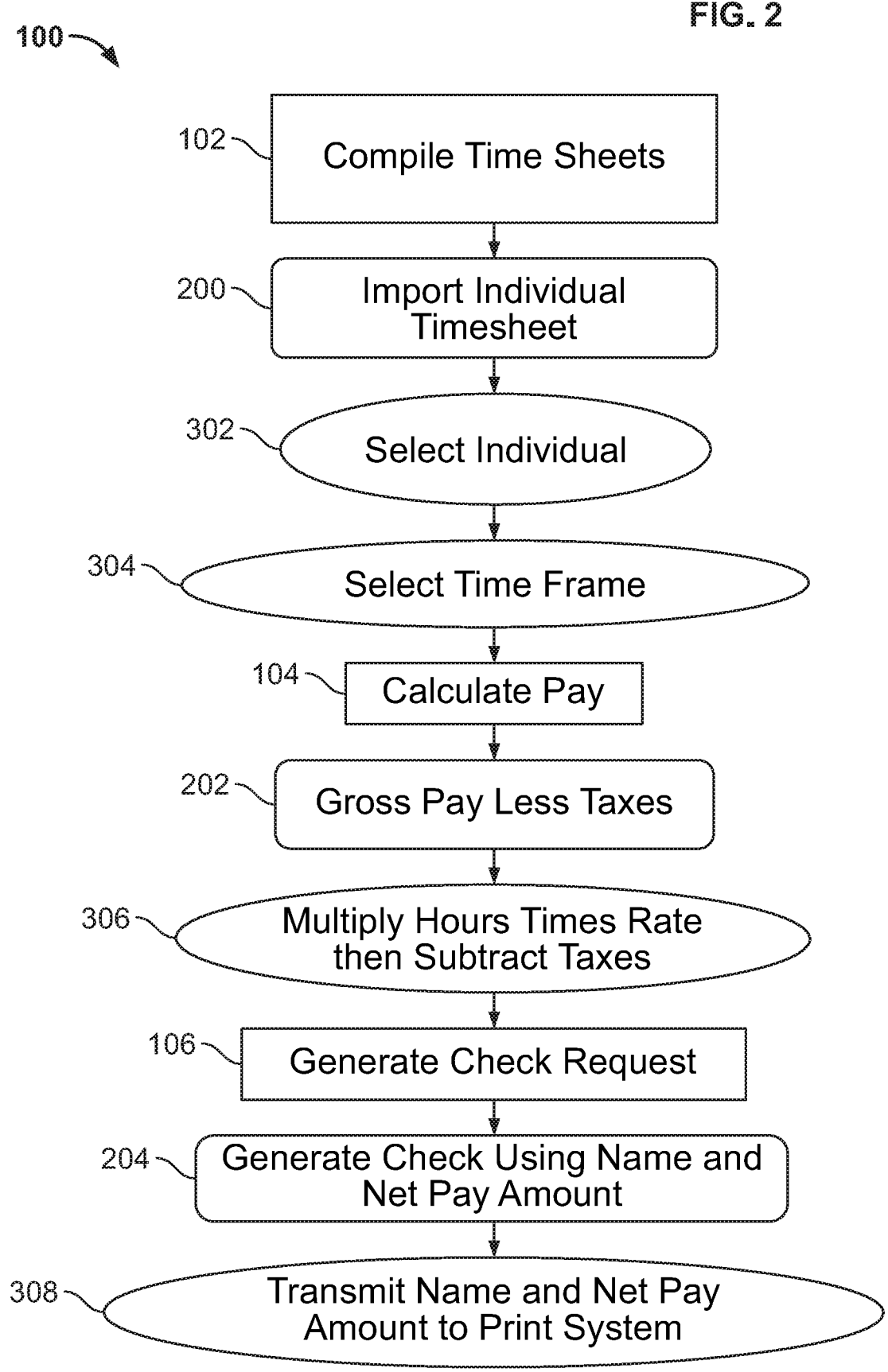
FIG. 2 shows a process map generated based on the process of FIG. 1 according to an embodiment.

The automation of the paycheck process 10 of FIG. 1 would improve the efficiency of the process as well as free up employees to perform more important tasks that may not be easily automated. A process map is a tool that may be used in the automation process to assist in understanding the process and automating the process. A process map of a process can be generated using information such as a step-by-step recording of a user performing the process using a computer and a flowchart of the process. The process map is a representation of the process FIG. 2 shows a process map 100 which is a graphical representation of process 10. Process map 100 shows the tasks, steps, and actions that need to be completed in order to complete the process of generating a paycheck. Tasks are shown as rectangles having sharp corners, steps are shown as rectangles having rounded corners, and actions are shown as ovals.

Process map 100, as shown in FIG. 2, comprises three tasks, specifically, COMPILE TIME SHEETS task 102, CALCULATE PAY task 104, and GENERATE CHECK REQUEST task 106. Each of tasks 102, 104, and 106 must be completed in order to facilitate paying employees and each task comprises one or more steps. In one embodiment, tasks are named based on one or more of the steps that are associated with that task (e.g., a step or steps that is/are most relevant to the task).

COMPILE TIME SHEETS task 102 comprises IMPORT INDIVIDUAL TIMESHEET step 200. Step 200 must be completed in order to complete task 102. In one embodiment, steps are named based on one or more actions that are associated with that step (e.g., an action or actions that is/are most relevant to the step). IMPORT INDIVIDUAL TIMESHEET step 200 comprises SELECT INDIVIDUAL 302 action and SELECT TIME FRAME action 304. Each of actions 302 and 304 are required to be completed in order to complete step 200, which in turn is required to be completed in order to complete task 102. In one embodiment, steps are named based on one or more of the actions that are associated with that step (e.g., an action or actions that is/are most relevant to the step). In one embodiment, a natural language description of the steps is generated using one or more of natural language generation (NLG), word embedding, salience (place and font size/color), and/or a custom dictionary with important words as well as stop words.

FIG. 2 shows CALCULATE PAY task 104 comprising GROSS PAY LESS TAXES step 202, which in turn, comprises MULTIPLY HOURS TIMES RATE THEN SUBTRACT TAXES action 306. FIG. 2 also shows GENERATE CHECK REQUEST task 106 comprising GENERATE CHECK USING NAME AND NET PAY AMOUNT step 204 which in turn, comprises TRANSMIT NAME AND NET PAY AMOUNT TO PRINT SYSTEM action 308.

In one embodiment, process map 100 is generated by a process map server using a step-by-step recording of a process (e.g., process 10 shown in FIG. 1) performed by a person using a computer combined with a flowchart associated with the process.

Figure 3:
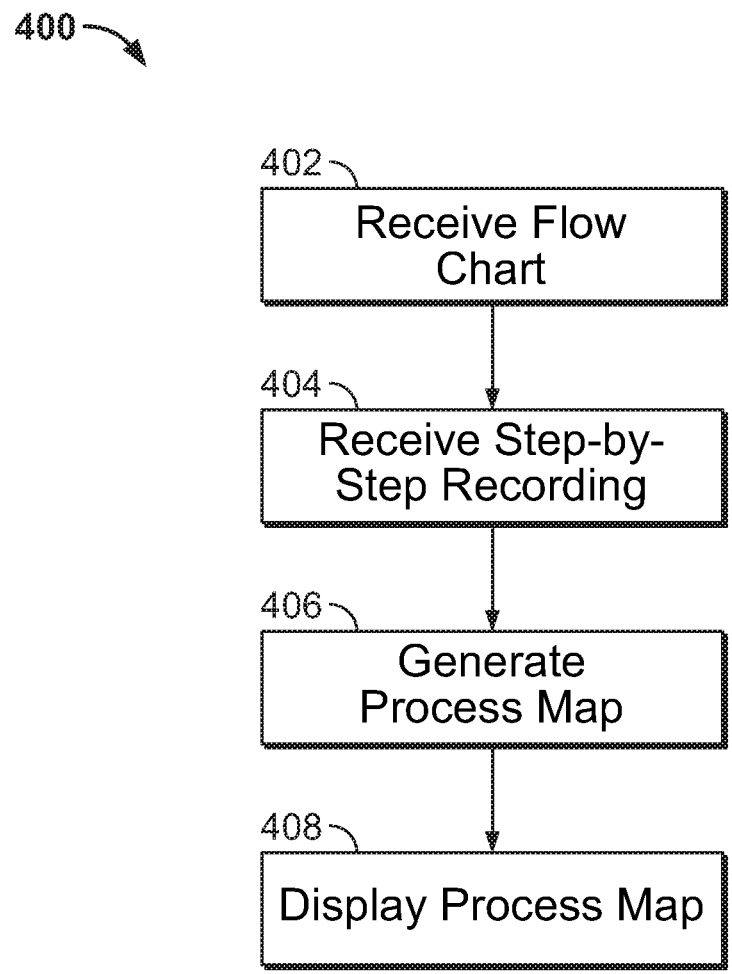
FIG. 3 shows a flowchart of a method for visualizing a process map of a process according to an embodiment.

FIG. 3 shows a flowchart 400 of a method for a process map server to visualize a process map according to an embodiment. At step 402, a flowchart pertaining to a particular process is received by the process map server. In one embodiment, petri nets or business process model/notation (BPM/-N) models of the process that can be combined with the traces are received instead of, or in addition to a flowchart are received at step 402. At step 404, a step-by-step recording pertaining to the particular process is received by the process map server. At step 406, a process map is generated by combining the flowchart and the step-by-step recording. In one embodiment, a layout of the process map is based on a layout of the flowchart. At step 408, the process map is displayed to a user. The process map can be displayed to the user locally on a display connected to the process map server or remote from the process map server, such as via a display connected to the process map server over a wired or wireless network.

In one embodiment, the process map is derived and inferred from the step-by-step recordings of actual executions of a process and/or tasks associated with the process. The process map is generated at different levels of granularity and abstraction. Longer tasks are generated with more levels to ensure an easily read overview at the most abstracted (highest) level which can then be drilled into all the way to the most detailed level. Depending on the amount of recorded data and the variance in execution the most detailed level may correspond with one or more examples (traces). In the case of a single trace all the recorded (step-by-step) data can be immediately shown. If there are multiple traces, the traces can be aggregated with summary statistics as well as visualized as a list so that an analyst can select one or a smaller subset for more information. One to many mapping between high-level process maps and detailed steps is achieved, in one embodiment, by clustering on the metadata of the step (wherein the metadata is generated via optical character recognition (OCR), computer vision, document object model (DOM) tree, hardware event, causality score, word vector, etc.) and/or the steps belonging in a sequence model. The clusters are then tiled and represent a change in level. The process can then be performed iteratively or using hierarchical clustering.

The step-by-step recording, in one embodiment, comprises a recording of a user's input to a computer, and what the computer displays, while the user is performing the process associated with the flowchart. The flowchart, in one embodiment, comprises a plurality of tasks that are associated with the step-by-step recording. Each of the plurality of tasks comprises a plurality of steps and each of the plurality of steps comprises one or more actions. In one embodiment, each of the one or more actions is based on information from the step-by-step recording. For example, actions taken by the user while the user is performing the process (i.e., selection of icons and/or images displayed to the user, keyboard entries, mouse clicks, etc.) are included in the step-by-step recording.

In one embodiment, the step-by-step recording is generated using task mining techniques. Task mining, in one embodiment, is the obtaining of information regarding a task a user performs on a computer by analyzing one or more step-by-step recordings of user input to the computer and what is displayed by the computer. The step-by-step recordings can be related to a single process or multiple processes. The step-by-step recordings can be related to a single performance of a task or multiple performances of a task by one or more users. The step-by-step recordings use various techniques for capturing user input and screenshots such as hardware event intercept and/or video intercept to generate OCR, computer vision of controls, DOM tree, hardware event, causality score, word vector, etc.

Figure 4:
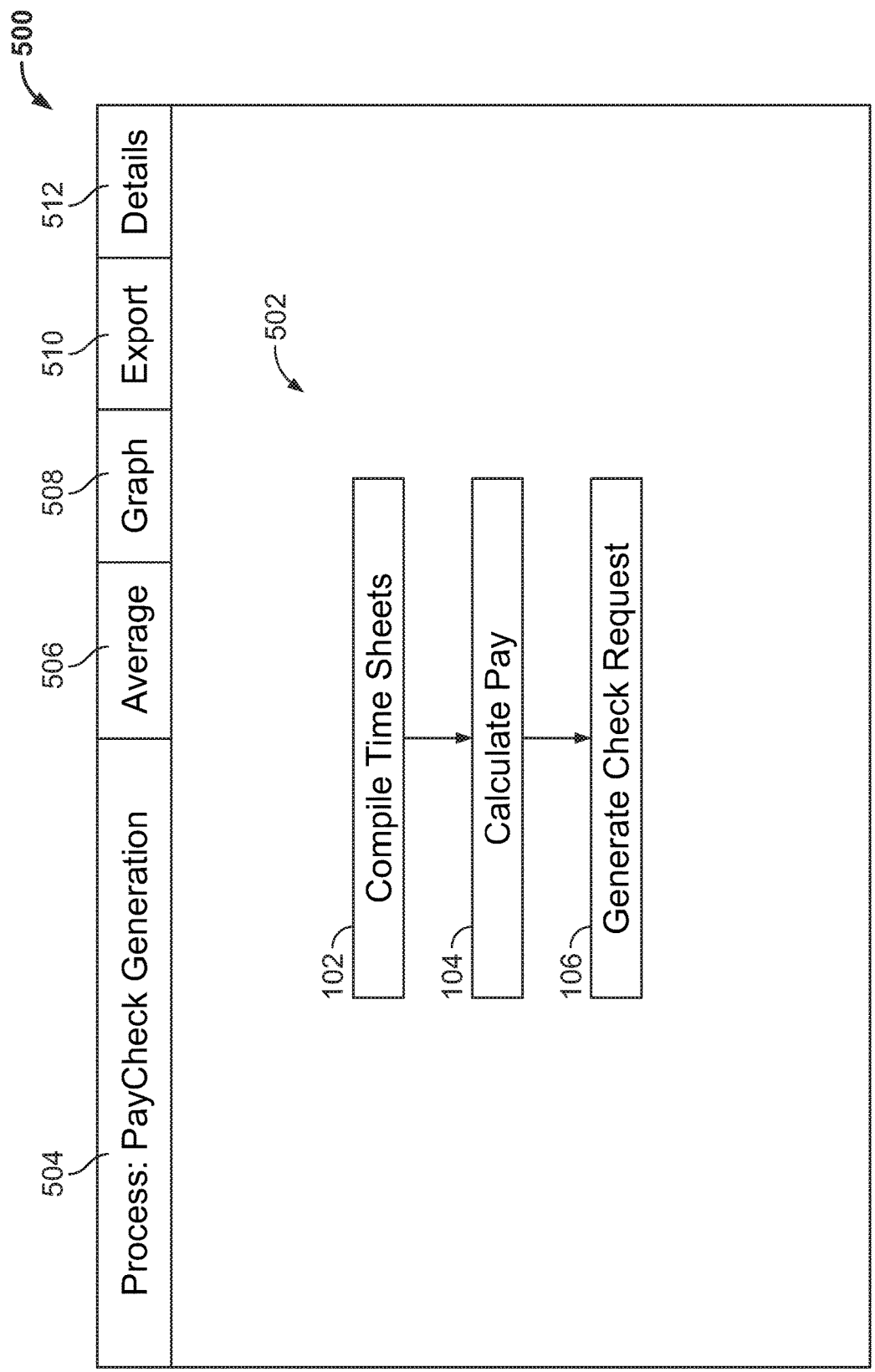
FIG. 4 shows a user interface according to an embodiment.

Process map 100 generated using the method shown in FIG. 3, in one embodiment, is displayed to a user via a user interface ("UI"). Process map 100 can be collapsed and expanded in response to user input in order to allow a user to focus on different portions of process map 100. FIG. 4 shows UI 500 comprising a visualization of process 10 shown as collapsed process map 502. UI 500 includes process identification 504 which identifies the process shown in UI 500. In this example, process identification 504 shows "paycheck generation" which is the name of process 100. A user may interact with UI 500 via inputs, such as a mouse and or keyboard, in order to select various portions of UI 500, such as elements of the displayed collapsed process map 502 and displayed icons. Collapsed process map 502 comprises a portion of process map 100. Specifically, collapsed process map 502 has been collapsed to show only the task level, that is tasks 102, 104, and 106. Tasks 102, 104, and 204 can be expanded to show the steps that are associated with each task. This may be accomplished by a user selecting a particular task via an input device (e.g., mouse click). Similarly, displayed steps can be expanded to show the actions that are associated with each step by a user selecting a particular step.

Figure 5:
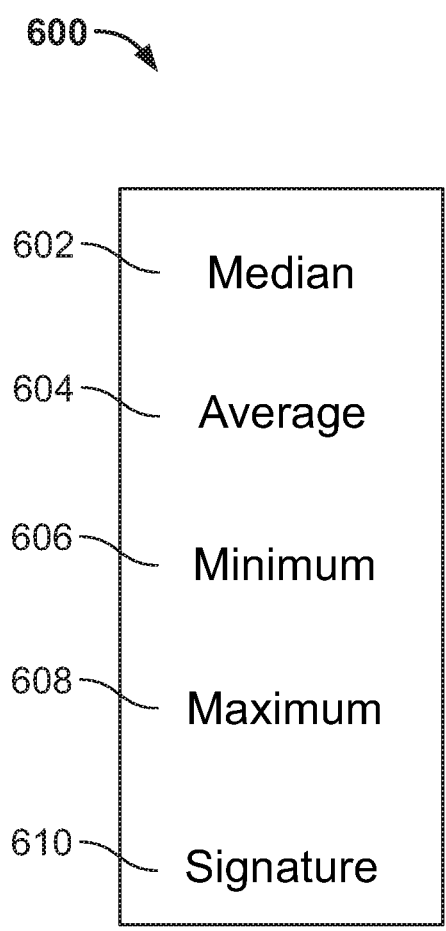
FIG. 5 shows an analysis popup window according to an embodiment.

UI 500, in one embodiment, includes icons analysis 506, graph 508, export 510 and details 512 available for selection by a user. Those icons are collectively referred to as the dashboard or the process. A user selecting analysis 506 is presented with analysis popup window 600 as shown in FIG. 5. Analysis popup window 600, in one embodiment includes five weight metrics from which to choose. The weight metrics include median 602, average 604, minimum 606, maximum 608, and signature 610. In one embodiment, based on the weight metric selected, a graph is displayed to a user. The weight metrics, in one embodiment, are based on time calculations. When a user selects the weight metric median 602, a graph of a trace that took as close to the median time to execute is displayed. When a user selects the weight metric average 604, a graph of a trace that took as close to the average time to execute is displayed. When a user selects the weight metric 606, an execution example that took the least amount of time is displayed. When a user selects the weight metric maximum 608, an execution example that took the most amount of time is displayed. When a user selects the weight metric signature 610, a summary of the process wherein only steps that an algorithm determines to be important from a clustering perspective are included. In one embodiment, sequential models, including Poisson Cascades, can be used to score causality. Typically only steps that cause another step with high probability are included in a weight metric signature. Steps that have a loose affiliation with the arc process in the flow chart can be excluded (similar to the operation of a noise filter).

Figure 6:
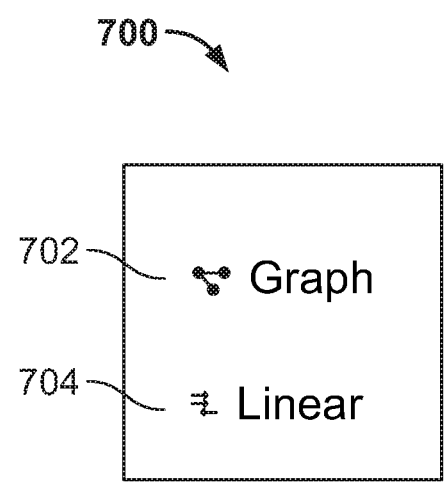
FIG. 6 shows a graph popup window according to an embodiment.

Graph 508 of the dashboard, when selected, provides a user with popup window 700 shown in FIG. 6 having two options for displaying a process map. Option graph 702, when selected by the user, shows the process map using a tree representation (when appropriate based on whether the process map has multiple branches). Option linear 704, when selected by the user, shows the process map in the form of a sequence.

Export 510 of the dashboard, when selected, provides a user with popup window 700 shown in FIG. 6 having two options for exporting a process map. Option graph 702, when selected by the user, exports the process map using a tree representation (when appropriate based on whether the process map has multiple branches). Option linear 704, when selected by the user, exports the process map in the form of a sequence.

Details 512 of the dashboard, when selected, displays various information about collapsed process map 502 depending on the portion of collapsed process map 502 that is currently selected by a user. FIG. 7 shows popup window 800 that is displayed to a user in response to details 512 (shown in FIG. 4) being selected when a process, such as the process identified by collapsed process map 502 is selected. Popup window 800 displays information associated with collapsed process map 502. Information displayed includes data regarding process key process indicators (KPIs), both time spent to execute 802 and relative robotic process automation (RPA) score 804. The information displayed also indicates a number of users who executed the process 806, a number of steps in the process 808, and a variance between users' executions 810. KPIs, in one embodiment, include throughput time, human input, and metadata related to the process. In one embodiment, the RPA score is a weighted rank for RPA suitability taking human effort, repetitiveness, variance, and # of distinct users into account. Causality and cognitive complexity measures can be used for a more nuanced prioritization for RPA. In one embodiment, executions are connected to custom outcome KPIs as an additional composite and stand-alone data point.

FIG. 8 shows popup window 900 that is displayed when details 512 (shown in FIG. 4) is selected while a step of a process map is selected. In one embodiment, popup window 900 displays data and/or metadata pertaining to a related process, step, and/or a portion of the related process.

Figure 10:
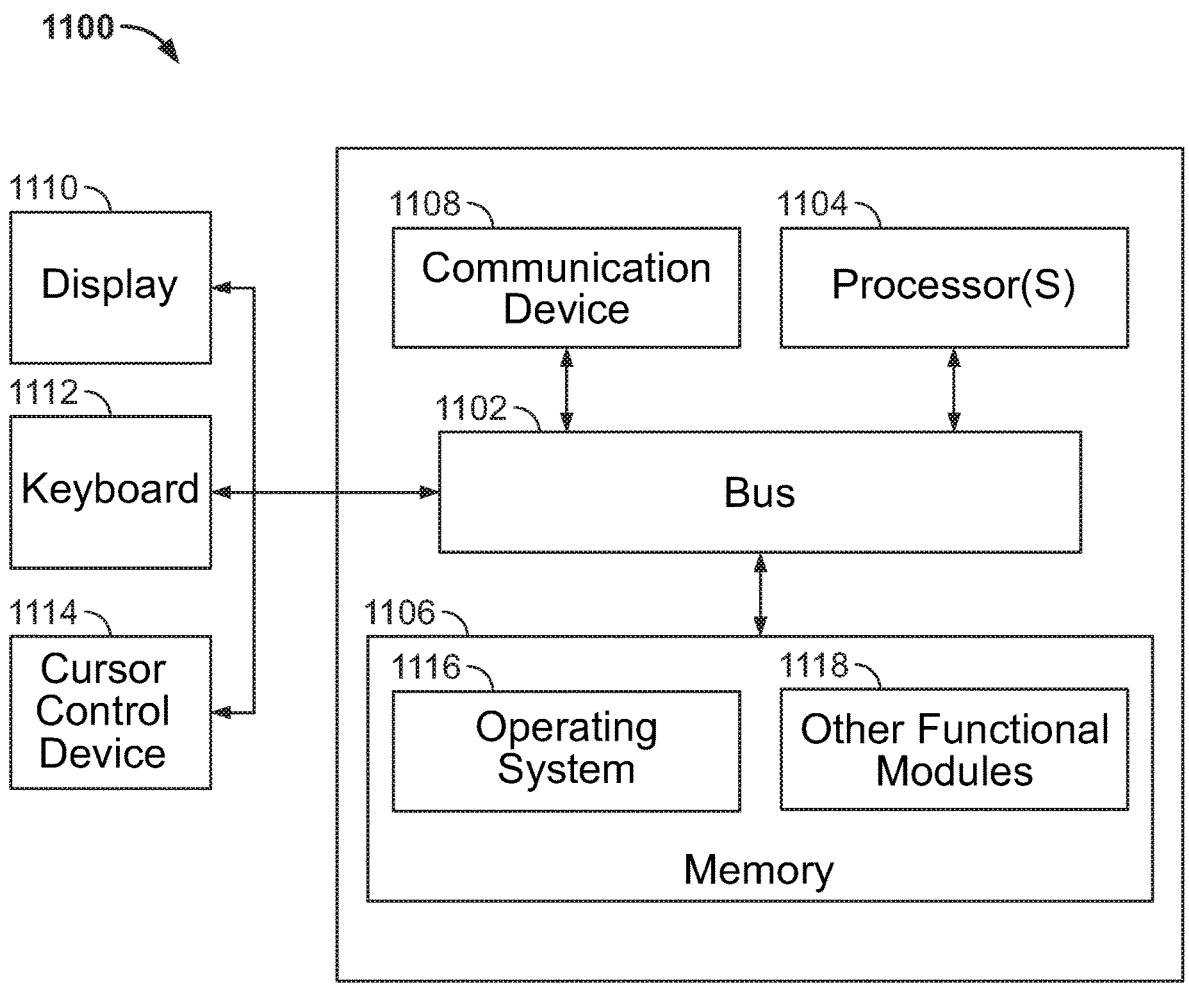
FIG. 10 shows a high-level block diagram of a computer for implementing a process map server according to an embodiment.

FIG. 9 shows popup window 1000 that is displayed when details 512 (shown in FIG. 4) is selected while an action of a process map is selected. In one embodiment, popup window 1000 displays data and/or metadata pertaining to a related process, action, and/or a portion of the related process FIG. 10 is a block diagram illustrating a computing system 1100 configured to execute the methods, workflows, and processes described herein, including FIG. 3, according to an embodiment of the present invention. In some embodiments, computing system 1100 may be one or more of the computing systems depicted and/or described herein. Computing system 1100 includes a bus 1102 or other communication mechanism for communicating information, and processor(s) 1104 coupled to bus 1102 for processing information. Processor(s) 1104 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1104 may also have multiple processing cores, and at least some of the cores may be configured to perform specific functions. Multi-parallel processing may be used in some embodiments.

Computing system 1100 further includes a memory 1106 for storing information and instructions to be executed by processor(s) 1104. Memory 1106 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1104 and may include volatile media, non-volatile media, or both. The media may also be removable, non-removable, or both.

Additionally, computing system 1100 includes a communication device 1108, such as a transceiver, to provide access to a communications network via a wireless and/or wired connection according to any currently existing or future-implemented communications standard and/or protocol.

Processor(s) 1104 are further coupled via bus 1102 to a display 1110 that is suitable for displaying information to a user. Display 1110 may also be configured as a touch display and/or any suitable haptic I/O device.

A keyboard 1112 and a cursor control device 1114, such as a computer mouse, a touchpad, etc., are further coupled to bus 1102 to enable a user to interface with computing system. However, in certain embodiments, a physical keyboard and mouse may not be present, and the user may interact with the device solely through display 1110 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1106 stores software modules that provide functionality when executed by processor(s) 1104. The modules include an operating system 1116 for computing system 1100 and one or more additional functional modules 1118 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

The invention claimed is:

1. A method for visualizing a process as a process map, the method comprising:
receiving, at a process map server, a flowchart of the process;
receiving, at the process map server, a step-by-step recording of a user's input to a computer and images the computer displays while the user is performing the process;
generating, by the process map server, metadata based on computer vision analysis of the images;
generating, by the process map server, a process map by combining the flowchart and the step-by-step recording, the process map comprising at least one of the images and a mapping based on clustering of the generated metadata; and
displaying the process map on a display.

2. The method of claim 1, wherein the displaying the process map comprises:
displaying a task associated with the process.

3. The method of claim 2, wherein the displaying the process map comprises:
displaying a step associated with the task in response to selection of the task.

4. The method of claim 3, wherein the displaying the process map comprises:
displaying an action associated with the step in response to selection of the step.

5. The method of claim 1, further comprising:
receiving a petri net model of the process,
wherein the generating a process map further comprises combining the petri net model with the flowchart and the step-by-step recording.

6. The method of claim 1, further comprising:
receiving a business process model/notation model of the process,
wherein the generating a process map further comprises combining the business process model/notation model with the flowchart and the step-by-step recording.

7. The method of claim 4, further comprising:
receiving input requesting collapse of the process map displayed; and
collapsing the process map to display only tasks.

8. An apparatus comprising:
a processor; and
a memory to store computer program instructions, the computer program instructions when executed on the processor cause the processor to perform operations comprising:
receiving, at the processor, a flowchart related to a process;
receiving, at the processor, a step-by-step recording of a user's input to a computer and images the computer displays while the user is performing the process;
generating, by the processor, metadata based on computer vision analysis of the images;
generating, by the processor, a process map by combining the flowchart and the step-by-step recording, the process map comprising at least one of the images and a mapping based on clustering of the generated metadata; and
displaying the process map on a display.

9. The apparatus of claim 8, wherein the displaying the process map comprises:
displaying a task associated with the process.

10. The apparatus of claim 9, wherein the displaying the process map comprises:
displaying a step associated with the task in response to selection of the task.

11. The apparatus of claim 10, wherein the displaying the process map comprises:

displaying an action associated with the step in response to selection of the step.

12. The apparatus of claim 8, the operations further comprising:

receiving a petri net model of the process, wherein the generating a process map further comprises combining the petri net model with the flowchart and the step-by-step recording.

13. The apparatus of claim 8, the operations further comprising:

receiving a business process model/notation model of the process, wherein the generating a process map further comprises combining the business process model/notation model with the flowchart and the step-by-step recording.

14. The apparatus of claim 11, the operations further comprising:

receiving input requesting collapse of the process map displayed; and collapsing the process map to display only tasks.

15. A non-transitory computer readable medium storing computer program instructions, which, when executed on a processor, cause the processor to perform operations comprising:

receiving, at the processor, a flowchart related to a process;

receiving, at the processor, a step-by-step recording of a user's input to a computer and images the computer displays while the user is performing the process;

generating, by the processor, metadata based on computer vision analysis of the images;

generating, by the processor, a process map by combining the flowchart and the step-by-step recording, the process map comprising at least one of the images and a mapping based on clustering of the generated metadata; and displaying the process map on a display.

16. The non-transitory computer readable medium of claim 15, wherein the displaying the process map comprises:

displaying a task associated with the process.

17. The non-transitory computer readable medium of claim 16, wherein the displaying the process map comprises:

displaying a step associated with the task in response to selection of the task.

18. The non-transitory computer readable medium of claim 17, wherein the displaying the process map comprises:

displaying an action associated with the step in response to selection of the step.

19. The non-transitory computer readable medium of claim 15, the operations further comprising:

receiving a petri net model of the process, wherein the generating a process map further comprises combining the petri net model with the flowchart and the step-by-step recording.

20. The non-transitory computer readable medium of claim 15, the operations further comprising:

receiving a business process model/notation model of the process, wherein the generating a process map further comprises combining the business process model/notation model with the flowchart and the step-by-step recording.

* * * * *